(No Model.)
W. H. GIBBS.
CHURN DASHER.
No. 316,028. Patented Apr. 21, 1885.
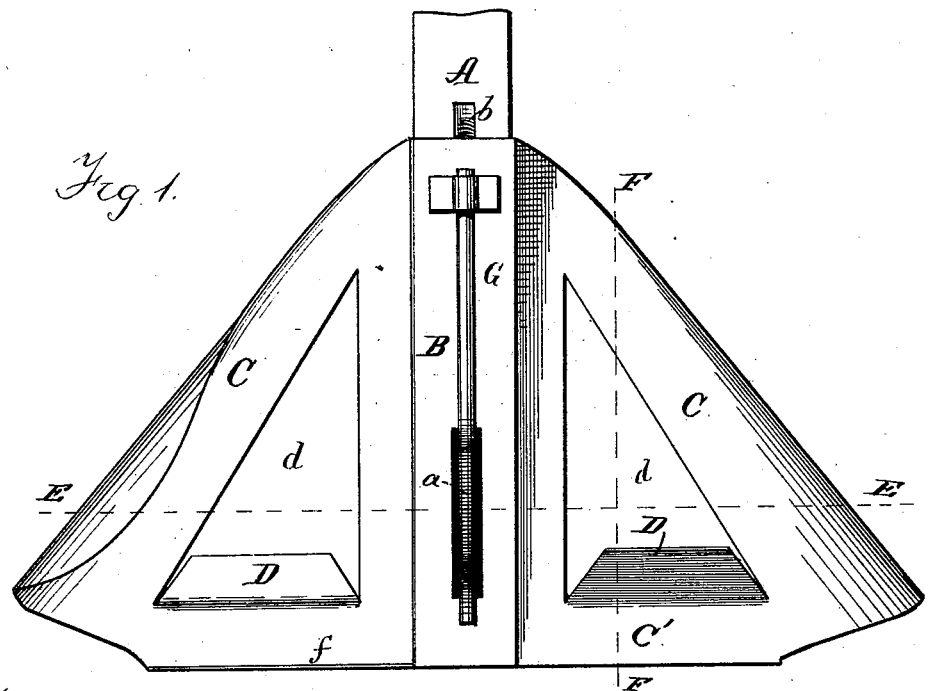
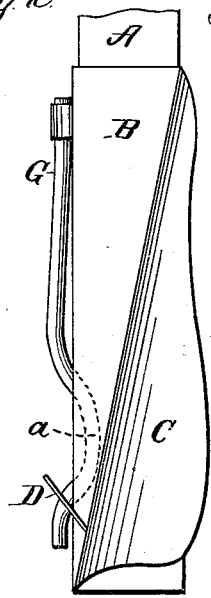 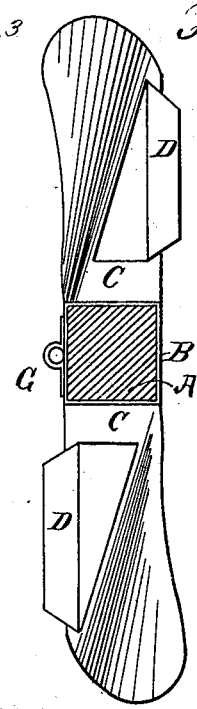 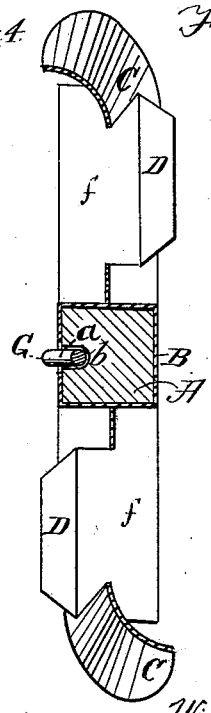 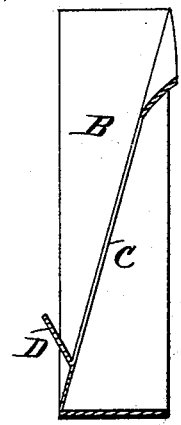
Witnesses:
Wm. A. Rosenbaum
G. B. Towles.
Inventor:
William H. Gibbs
by W. Burris
Atty

UNITED STATES PATENT OFFICE.

WILLIAM HENRY GIBBS, OF LYONS, IOWA.

CHURN-DASHER.

SPECIFICATION forming part of Letters Patent No. 316,028, dated April 21, 1885.

Application filed May 5, 1884. (No model.)

*To all whom it may concern:*

Be it known that I, W. H. GIBBS, a citizen of the United States of America, residing at Lyons, in the county of Clinton and State of Iowa, have invented certain new and useful Improvements in Churn-Dashers, of which the following is a specification, reference being had therein to the accompanying drawings.

My invention relates to an improved churn-dasher; and it consists of the combination of a shaft provided with a series of notches arranged one above another, a dasher having a socket to receive the shaft, and provided with spiral-shape wings having inclined lips, and a spring attached to the dasher and adapted to hold the dasher at any required position on the shaft, as hereinafter fully set forth.

In the drawings, Figure 1 is a side view. Fig. 2 is an edge view. Fig. 3 is a top view. Fig. 4 is a cross-section on line E E of Fig. 1. Fig. 5 is a vertical section on line F F of Fig. 1.

A designates the dasher-shaft, which is provided with a series of notches, $b$, arranged one above another, to receive a spring-catch attached to the dasher to hold it in place upon the shaft, as hereinafter described.

B is the dasher, having a socket to receive the lower portion of the shaft. This dasher is provided with spiral-shape wings C, having openings $d$, upwardly-inclined lips D, and horizontal flanges $f$.

G is a spring-wire having its upper end attached to the upper portion of the dasher, and its lower portion, $a$, bent inward and extended through a slot in the dasher into one of the notches $b$ in the shaft, for holding the dasher at any required position vertically on the shaft.

This improved dasher is constructed to be rotated by any suitable mechanism.

Most churns fail to utilize all the cream, leaving portions of it unconverted in the corners and angles of the churns.

The spiral wings, horizontal flanges, and upwardly-inclined lips of my improved dasher enable it to gather the cream from the bottom and force it upward and over at the top of the body of the cream, thus thoroughly agitating all portions of the cream, and at the same time the air is forced through it, aiding in the separation of the fluid from the butter, securing thus the greatest quantity of butter from the amount of cream used.

By means of the spring on the dasher and the notches on the shaft the dasher may be adjusted vertically, so as to adapt its position to suit any amount of cream that may be used in the churn.

With this improved dasher the cream is converted into butter without breaking its grain. Then, the buttermilk being drawn off, the butter washed with clean water, and the water drawn off, the butter may be seasoned to suit the taste by adding and properly working through it a sufficient quantity of pure salt brine.

What I claim as new, and desire to secure by Letters Patent, is—

The combination of the shaft A, provided with a series of notches, $b$, the churn-dasher B, having a socket to receive the shaft, and provided with the spiral-shape wings C, having the openings $d$, the upwardly-inclined lips D, and the horizontal flanges $f$, and the spring G, attached to the dasher, and provided with the bent portion $a$, adapted to catch in the notches $b$, to hold the dasher at any required position on the shaft, substantially as and for the purposes described.

In testimony whereof I hereunto affix my signature in presence of two witnesses.

WILLIAM HENRY GIBBS.

Witnesses:
W. W. SANBORN,
H. F. BOWERS.